G. W. CHURCHILL.
FLUID PRESSURE TRANSMISSION MECHANISM.
APPLICATION FILED MAY 15, 1917.
1,298,178.
Patented Mar. 25, 1919.
3 SHEETS—SHEET 1.
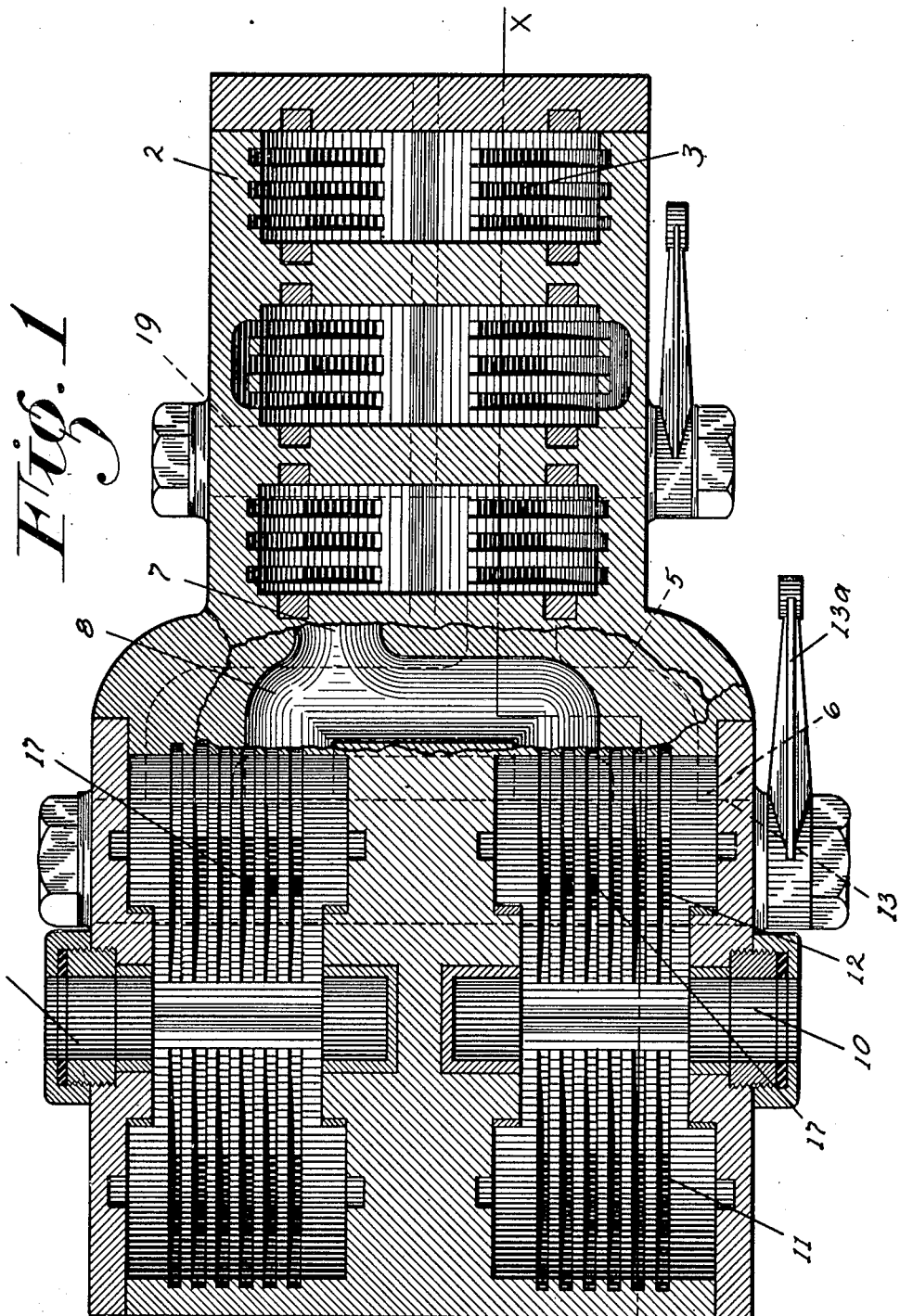
WITNESS:
Bernard Privat
INVENTOR.
Grant W. Churchill
BY
Perry S. Webster
ATTORNEY.

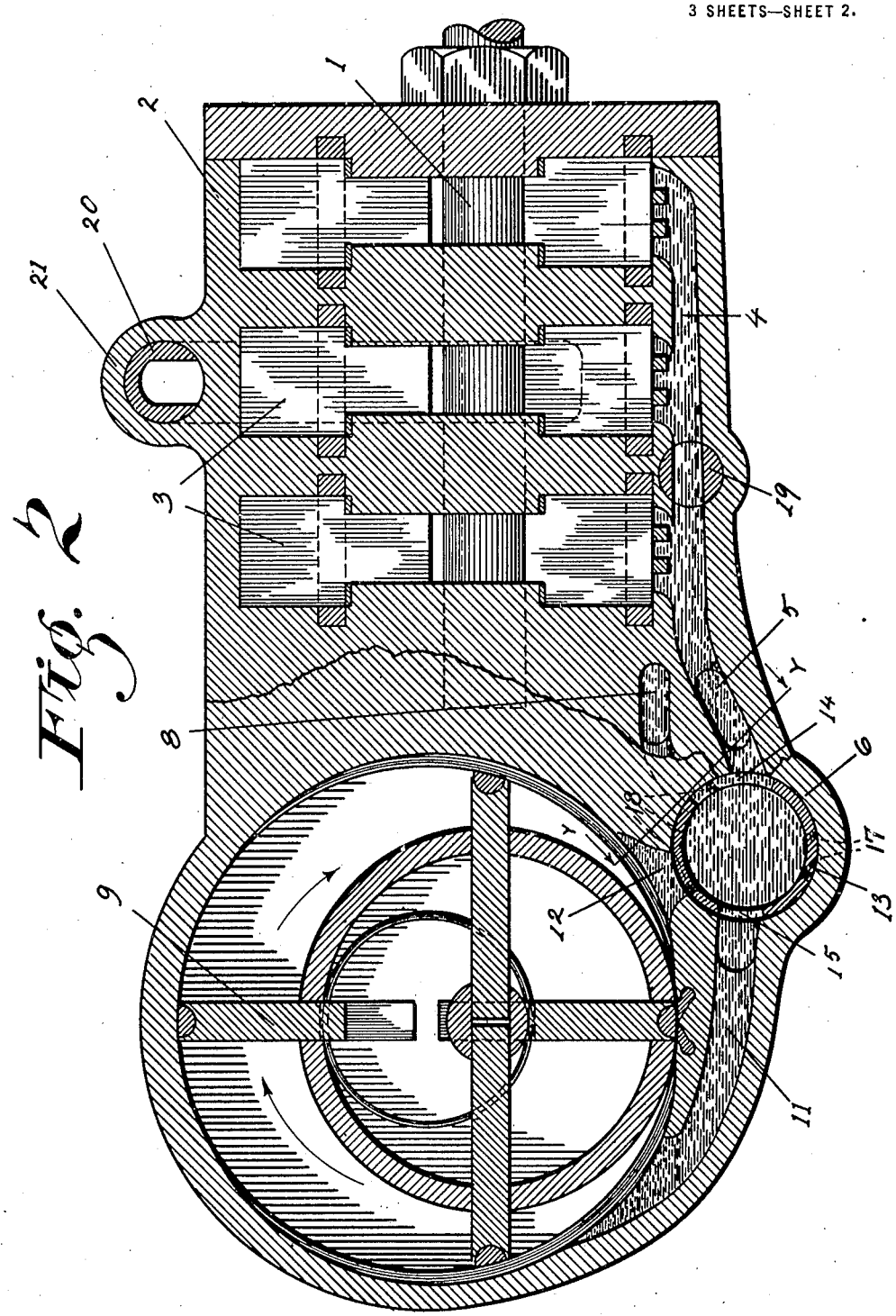

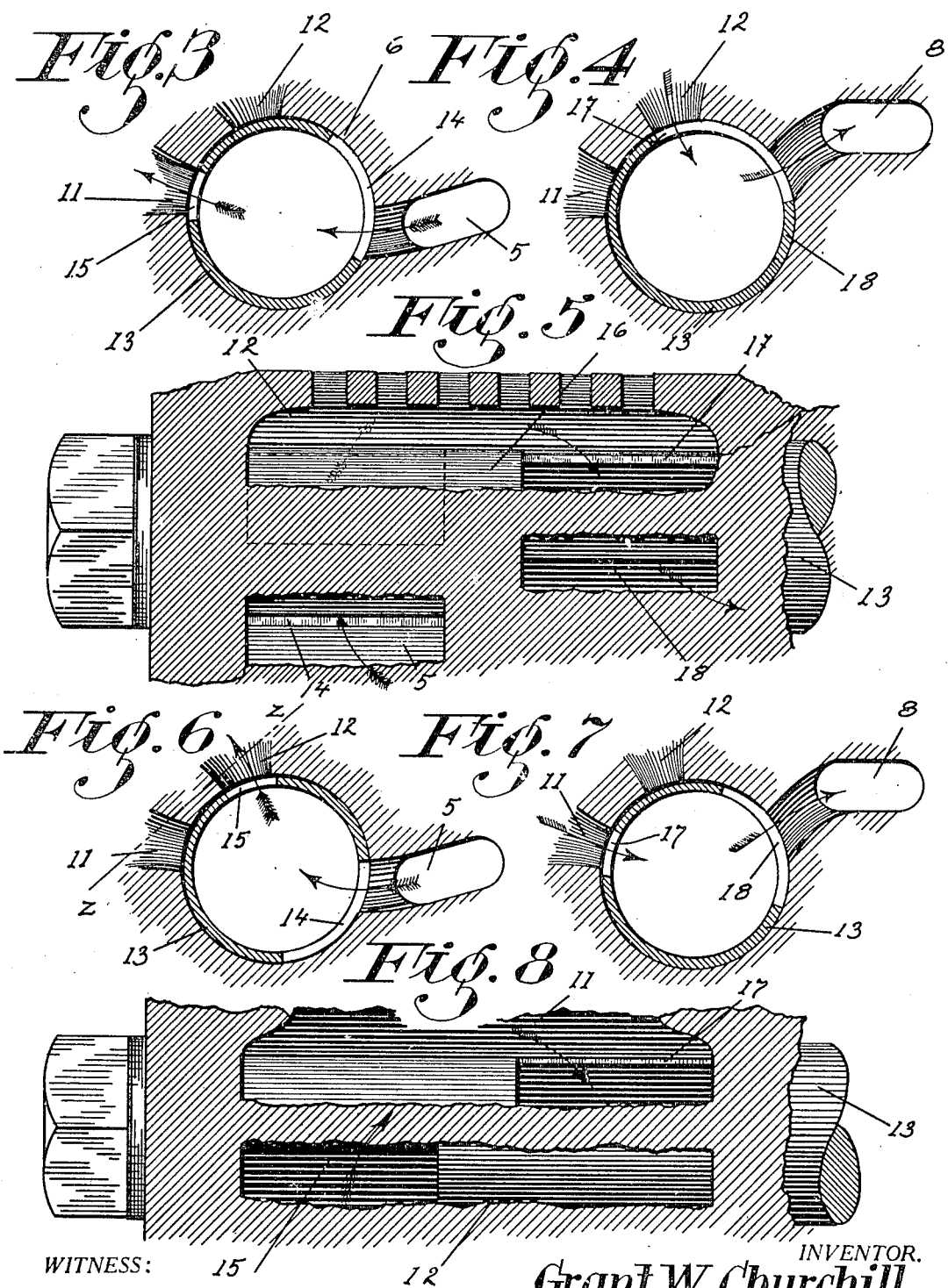

UNITED STATES PATENT OFFICE.

GRANT W. CHURCHILL, OF SACRAMENTO, CALIFORNIA.

FLUID-PRESSURE TRANSMISSION MECHANISM.

1,298,178.  Specification of Letters Patent.  Patented Mar. 25, 1919.

Application filed May 15, 1917. Serial No. 168,760.

*To all whom it may concern:*

Be it known that I, GRANT W. CHURCHILL, a citizen of the United States, residing at Sacramento, in the county of Sacramento, State of California, have invented certain new and useful Improvements in Fluid-Pressure Transmission Mechanism; and I do declare the following to be a full, clear, and exact description of the same, reference being had to the accompanying drawings, and to the characters of reference marked thereon, which form a part of this application.

This invention relates to improvements in means and apparatus for transmitting power from a driving element such as electric motor, gas engine or the like to various driven elements such as axles of motor wheels or such similar elements. The object of the invention is to produce a transmission mechanism which will be operable by fluid pressure such as oil and without the necessity of the use of co-acting gears, belts or any of the other variously used forms of transmission mechanism now in common use. My improved mechanism is designed to use fluid pressure for transmitting the power in such a manner as to allow of a complete and accurate control of speed and power without any frictional wear or strain on the parts. Also by means of my improved mechanism, the speed and power can be controlled in direct relation to the speed of the initial power without the necessity of building the same up in the step by step manner which is now necessary with the common forms of gear transmissions.

A further object of the invention is to produce a simple and inexpensive device and yet one which will be exceedingly effective for the purposes for which it is designed.

These objects I accomplish by means of such structure and relative arrangement of parts as will fully appear by a perusal of the following specifications and claims.

In the drawings similar characters of reference indicate corresponding parts in the several views.

Figure 1 is a horizontal longitudinal section through my complete transmission structure with the pump removed showing the same partly broken out to reveal the return passage way for the fluid.

Fig. 2 is a vertical longitudinal section through the mechanism taken relatively on a line X—X of Fig. 1.

Fig. 3 is a vertical section through the control valve located between the driving element and one driven element for controlling the flow of the fluid from such driving element to the driven element. The parts are here shown in the position they assume when the driven element is being moved forwardly.

Fig. 4 shows the corresponding valve located between the opposite side of the driven element, and controlling the flow of the fluid from the driven element back to the driving element. These parts are here positioned to correspond to the forward movement of the driven element.

Fig. 5 is a sectional view of about one-half of the valve casing taken relatively on a line Y—Y of Fig. 2 and showing a plan of the portion of the valve shown in Figs. 3 and 4. In this view the arrows with the full stems show the flow of the fluid from the driving element against the driven side of the driven element while the arrows with half stems show the flow of the fluid from the discharge side of the said driven element.

Figs. 6, 7 and 8 are views corresponding to Figs. 3, 4 and 5 but showing the parts of the valve in those positions which they assume when the driven element is being moved backwardly. Fig. 8 is taken on a line Z—Z of Fig. 6.

My improved transmission mechanism comprises mainly a plurality of rotary pumps driven by the main power shaft from the power plant. The rotary motion of these pumps is in the same direction as that of said main shaft. The fluid is moved by these pumps against other pumps set to rotate at right angles to the rotation of the main shaft and pumps. I preferably have two of these driven pumps each of which drives one shaft to which may be connected the wheels of a motor vehicle or other suitable power wheels. Interposed between the driving pumps and the driven pumps, I provide a valve mechanism whereby the fluid moving from the driving pumps may be forced against one side or the other of the driven pumps to drive the same forwardly or backwardly as is desired to drive the shafts forwardly or backwardly. There is one main fluid passage way leading from the driving pumps to the driven pumps and one main passage way leading from the driven pumps to the driving pumps for the purpose of keeping the fluid always moving in one constant direction. The valve structure is designed to place these main passage ways into or out of communication with one side or the other of the driven pumps.

Referring now more particularly to the characters of reference on the drawings the numeral 1 designates the driving shaft from the power unit. This driving shaft projects into a suitable casing 2 where it is operatively connected with a desired number of rotary pumps 3 of any type found suitable for the purpose. The discharge sides of these pumps 3 communicates with a passage way 4 which in turn communicates with a passage way 5 extending at right angles to the passage way 4 and having communication with the valve casing 6. The inlet side of the pumps 3 are communicated with by a passage way 7 leading from a passage way 8 extending at right angles thereto which passage way 8 has communication at each end with the valve casing 6.

The said passage way 8 enters said casing slightly above the passage way 5, but is adjacent the same in a horizontal plane, the width of the two together with the dividing metal there between being that of one of the pumps 9.

Set within the casing 2 so as to rotate at right angles to the rotation of the pumps 3, are two pumps 9 each having bearings 10 for the reception of the driven shafts, (these not being shown in Fig. 1). Passage ways 11 lead from the valve casing 6 to one side of each of the chambers of the pumps 9 across the full width thereof, while passage ways 12 of a similar width lead from the casing 6 and are spaced above passage ways 11 a distance equal to the height of said passage ways 11 in a vertical line therewith, leading to a point on the opposite side of the chamber of the pumps 9, passage ways 11 and 12 being spaced apart in said chamber a distance approximately that between any two pump vanes at this point. The width of the passage ways 11 and 12 is that of passage ways 5 and 8 combined at the point where they terminate in the casing 6. The fluid being driven from the pumps 3 through the passage way 4 and passage way 5 can be directed through the valve casing 6 either into passage ways 11 to drive the pumps 9 forwardly or may be driven through passage ways 12 to drive the pumps 9 backwardly. This flow of the fluid is controlled by means of a tubular valve 13 rotatably seated in the casing 6 and provided with an operating arm 13$^a$. This valve 13 has a set of ports for each of the pumps 9. For the purpose of illustrating the same I will only describe one set since the other is identical.

Referring now to Figs. 3 and 5, this shows the valve 13 set to place the passage way 5 into communication with the passage way 11 to direct the flow of the fluid against the pumps 9 to drive it in a forwardly direction and when this condition exists, the passage way 12 is in communication with the passage way 8 to allow of the flow of the fluid from the discharge side of the pumps 9 back to the inlet side of the pumps 3 by means of the passage way 7. To this end a port 14 in the valve 13 the same width as passageway 5 is in register therewith, this port having a circumferential width equal to that of passageways 11 and 12 plus the space therebetween, and a port 15 in said valve, having a width the same as that of port 14 and a height equal to that of passageway 11 is in register therewith so that the fluid will flow from the passageway 5 through the port 14, thence through the valve 13 and port 15 into the passageway 11 and against the pumps 9.

The valve 13 is provided with a vertical division wall 16 at the end of ports 14 and 15, and on the farther side thereof are ports 17 and 18, having a width equal to that of the passageway 8, and so alined with respect to ports 14 and 15 that when the passageway 5 is in open communication with passageway 11, the port 18 is in register with the passageways 12 and 8. Thus the fluid being driven against the pumps 9 through passageway 11, moves through the pump and into the passageway 12 at the discharge end of the pump, and thence by way of the port 18 in the valve 13 to the passageway 8 to the intake side of pumps 3.

In Figs. 6, 7 and 8 are shown the positions of the ports when the pumps 9 are to be driven in the reverse direction to that indicated above. Under these conditions the port 14 communicates with the port 5 while the port 15 communicates with the port 12, the port 11 being thus shut off from communication with the said port 5. The port 17 is then in register with the passageway 11, while port 18 is still in register with passageway 8, the passage 12 being then shut off from communication with the passageway 8. Thus the fluid flows from the passageway 5 through ports 14 and 15 in the valve into the passageway 12 against the pump 9 to drive the same in a reverse direction to that above described, thence discharging through the passageway 11, through the ports 17 and 18 in the valve 13, and into the passageway 8. From the above description it can be seen that by merely turning the valve 13, predetermined distance the pumps 9 may be driven in one direction or the other. In order to increase the power of the driving pumps 3 to correspond to the increase of power in the gear transmission by putting the same into low gear I provide a means for cutting out a portion of said pumps from communication with the passage way 5. This is done by means of a valve 19 interposed in the passage way 4 which can be turned to close such passage way. Another valve 20 and by-pass 21 is then opened and the fluid from those pumps which are isolated, will be driven through the by-pass 21 instead of against the driven pumps.

From the foregoing description it will be readily seen that I have produced such a device as substantially fulfils the object of the invention as set forth herein.

While this specification sets forth in detail the present and preferred construction of the device, still in practice such deviations from such detail may be resorted to as do not form a departure from the spirit of the invention, as defined by the appended claim.

Having thus described my invention what I claim as new and useful and desire to secure by Letters Patent is:

A fluid pressure transmission mechanism comprising a casing, a set of driving rotary pumps, and a set of driven rotary pumps arranged at right angles to the first set mounted in the casing, a passage way common to all the discharge sides of the driving pumps, a tubular hand-controlled valve rotatably seated in the casing axially parallel to the axis of the driven pumps in the path of the said passageway, diametrically opposed slotted ports in said valve for each driven pump unit arranged to constantly register with the said passageway and with either of a pair of passageways leading to the chamber of each of the driven pumps, and being spaced apart a circumferential distance approximately that of any two pump vanes at this point, the width of said first named passageway being slightly less than one half that of the two last named passageways, as are also the ports in the valve registering therewith, another passageway in said casing common to all the said driving pumps leading from the intake sides thereof to said tubular valve and being adjacent to and the same width as said first named passageway at this point, slotted ports in said tubular valve adapted to register with the last named passageway and that one of the second named passageways not then in communication with the first named passageway, and a vertical wall in the said tubular valve separating the first named from the last named port units, all whereby a continuous flow of fluid through the driving and driven pumps may be had.

In testimony whereof I affix my signature.

GRANT W. CHURCHILL.